Oct. 28, 1969 E. PORT 3,475,601
CONTROLLED IMPEDANCE ANALOG MULTIPLIER CIRCUIT IN WHICH A DIFFERENTIAL AMPLIFIER OUTPUT DRIVES A FIELD EFFECT TRANSISTOR
Filed Aug. 24, 1967
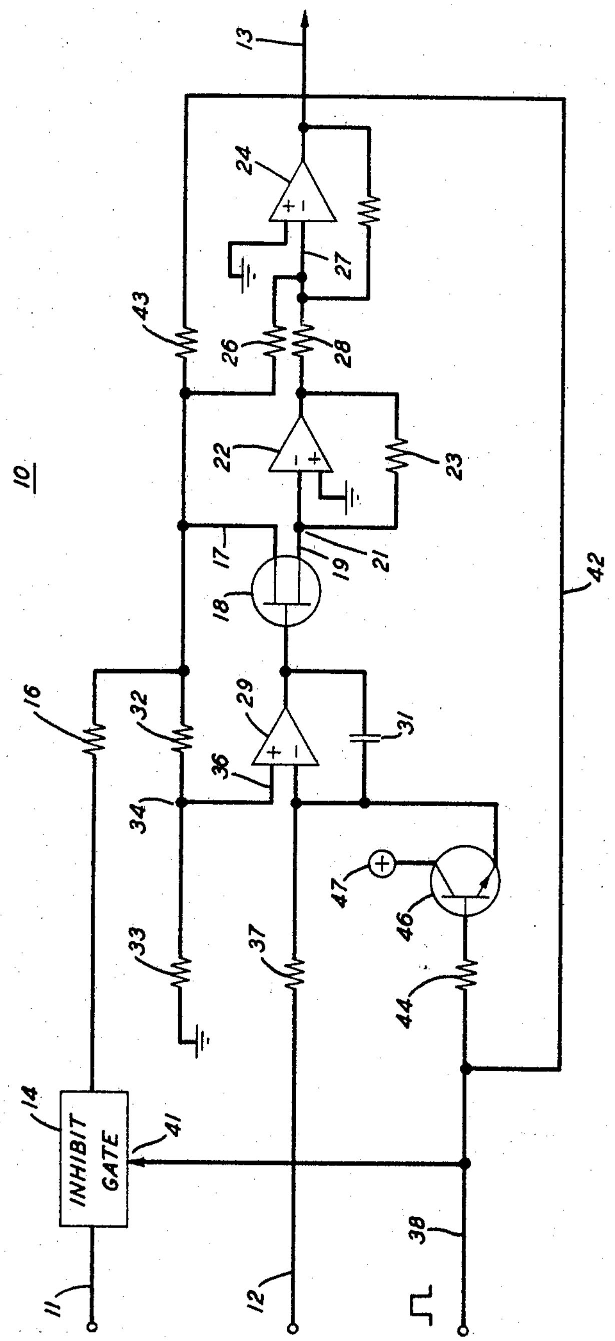
INVENTOR
E. PORT
BY J. P. Kearns
ATTORNEY United States Patent Office 3,475,601

Patented Oct. 28, 1969

3,475,601

CONTROLLED IMPEDANCE ANALOG MULTIPLIER CIRCUIT IN WHICH A DIFFERENTIAL AMPLIFIER OUTPUT DRIVES A FIELD EFFECT TRANSISTOR

Erich Port, Stuttgart, Germany, assignor to Bell Telephone Laboratories, Incorporated, Murray Hill, and Berkeley Heights, N.J., a corporation of New York Filed Aug. 24, 1967, Ser. No. 663,148
Int. Cl. G06g 7/16, 7/12
U.S. Cl. 235—194 9 Claims

ABSTRACT OF THE DISCLOSURE

An analog multipler circuit in which a Miller integrator drives a field effect transistor. The drain-to-source impedance of the field effect transistor is included as an input resistor to an operational amplifier to provide a signal proportional to the product of the drain-to-source conductance and the voltage across the field effect transistor. The center of a balanced voltage divider joining drain and source of the field terminal effect transistor is connected to the reference input of the Miller integrator normally to provide feedback which linearizes the drain-to-source voltage versus current characteristic of the field effect transistor. To set the multiplier to a desired initial condition, voltages are applied to the summing point of the Miller integrator and the drain of the field effect transistor so that the feedback loop temporarily serves to bring the field effect transistor resistance to a predetermined value.

FIELD OF THE INVENTION

This invention relates to an analog multiplier and particularly to a circuit for providing an output signal related to the product of two applied signals in which the output signal may be initially brought to a predetermined value.

BACKGROUND OF THE INVENTION

Various electronic systems require circuits, such as analog multipliers, for providing signals which are the product of two applied signals. In the design and manufacture of such multipliers, a great deal of effort and expense are expended to obtain a multiplier which, when mass produced, will result in units having predictable transfer characteristics.

It has been recognized that controlled impedance multipliers, such as those employing field effect transistors, lamp photocell arrangements, or varicaps can be used as multipliers resulting in smaller, lighter and less costly multipliers. However, the transfer characteristic exhibited by such a multiplier is a function of the characteristic of the controlled impedance device employed therein. As a result of the wide spread in characteristics of controlled impedance devices of the same type, the characteristics of a multiplier employing a particular type of controlled impedance device may differ substantially from those of another like-constructed multiplier employing the same type of controlled impedance device. Therefore, while the multiplication factor of a controlled impedance multiplier will always vary when a controlled input signal is varied with in the linear range of the multiplier, the exact characteristic exhibited by a given multiplier is not readily predictable for a given controlled input signal.

When a multiplier is included in a feedback system (see, for example, the system disclosed in Patent No. 3,292,110, issued Dec. 13, 1966, to F. K. Becker et al., and entitled "Transversal Equalizer for Digital Transmission Systems Wherein Polarity of Time-Spaced Portions of Output Signal Controls Corresponding Setting"), so that the first of the applied signals is a feedback control signal, it is not necessary that the transfer characteristics be as well known as in conventional multipliers so long as the output signal from the multiplier can be set to an initial value for a given value of the second signal. The feedback process, once initiated, will then maintain the output of the multiplier at its proper value so that less sophisticated multiplier circuits may be employed. An initial appraisal of the situation, however, would lead one to believe that this problem could require as much effort and expense as tailoring the entire transfer characteristic of the multiplier because the variations in transfer characteristic of the controlled impedance devices must still be accounted for to set the multiplier even to an initial condition.

BRIEF DESCRIPTION OF THE INVENTION

To solve the problems set forth above, the present invention employs a controlled impedance device, having a control input terminal, in an analog multiplier. A signal to be multiplied controls a current flowing in the controlled impedance device to provide a voltage signal having an amplitude proportional to the product of the current and the conductance of the device. To set the multiplier initially the current is provided so that a predetermined current flows when the desired source-to-drain voltage is achieved. The voltage signal is monitored to provide a control signal which is applied to the control input terminal to drive the impedance of the device until a predetermined voltage signal is achieved.

In the disclosed embodiment, a field effect transistor, driven from an output of a differential amplifier, is employed. The center of a balanced voltage divider connected between source and drain electrodes of the field effect transistor is connected to the noninverting input of the differential amplifier. A resistor, through which the voltage signal is applied, is connected to the drain of the field effect transistor. When the current signal is applied, the inverting input, through which an adjusting signal is normally applied, is driven to a reference level so that the balanced voltage divider acts as a feedback path to provide an appropriate voltage through the differential amplifier to the gate of the field effect transistor.

The disclosed embodiment also shows that a capacitor is connected from the gate of the field effect transistor to the inverting input of the differential amplifier to hold the initial signal generated by the preset sequence as an initial condition. During normal operation, adjusting signals are integrated on the capacitor and therefore added to the initial signal.

DESCRIPTION OF THE DRAWING

The single figure of the drawing is a schematic representation of an analog multiplier circuit embodying the principles of the invention including a field effect transistor which may initially be set to a predetermined source-to-drain resistance value.

DETAILED DESCRIPTION

Referring now to the drawing, there is seen an analog multiplier 10 embodying the principles of this invention. The multiplier 10 may be employed as one of the multiplier attenuators in the system disclosed in the above-mentioned F. K. Becker et al. patent. When used in such a system a received data signal from a source, not shown, is applied to a data signal input terminal 11, to be multiplied by a value determined by integrating a differential adjusting signal applied to an adjusting input terminal 12. The differential adjusting signal is derived from equipment, not shown, in response to an output signal from output terminal 13 of the multiplier 10.

The data signal on the terminal 11 is normally passed by an inhibit gate 14 through a resistor 16 to drain electrode 17 of a field effect transistor 18. Source electrode 19 of the same field effect transistor 18 is applied to an input terminal 21 of an inverting operational amplifier 22 so that the source electrode of the field effect transistor is maintained at a virtual ground potential. The voltage appearing at the output of amplifier 22 is then equal to the voltage across source 17 and drain 19 of field effect transistor 18 divided by the source-to-drain impedance of field effect transistor 18 multiplied by the value of a feedback resistor 23 in amplifier 22. Since the voltage between source 17 and drain 19 of field effect transistor 18 is directly related to the signal on terminal 11, it is apparent that the output signal from amplifier 22 is proportional to the product of the signal applied to terminal 11 and the source-to-drain conductance of field effect transistor 18.

If it is required to be able to multiply the signal appearing on terminal 11 either by a positive, zero, or negative value, one may add to the signal at the output of amplifier 22 a signal directly proportional to the signal appearing on terminal 11. In this way the signal at the output of amplifier 22 can be adjusted to be the sum of the two above-mentioned signals and to exhibit positive, negative, or zero values. This adjustment is accomplished in summing amplifier 24. Resistor 26 is connected from drain 17 of field effect transistor 18 to inverting input terminal 27 of amplifier 24. Resistor 28 is provided to apply the signal from amplifier 22 to input 27 of amplifier 24 so that the signal appearing on output terminal 13 is proportional to the product of the signal appearing on the terminal 11 and the source-to-drain conductance of field effect transistor 18. As has been pointed out, the output signal on terminal 13 can be set to zero or to positive or negative multiples of the input signal on terminal 11 by appropriate adjustment of the source-to-drain impedance of field effect transistor 18.

The source-to-drain impedance of the field effect transistor 18 is adjusted by varying the gate-to-source voltage of field effect transistor 18. An inverting operational amplifier 29 shunted by capacitor 31 is employed as a Miller integrator to control the gate-to-source voltage of field effect transistor 18. A Miller integrator is a high negative gain amplifier with capacitive feedback. A high impedance voltage divider, comprising resistors 32 and 33, each having typical values of 150K ohms and joined at center position 34, is connected between drain 17 of the field effect transistor 18 and ground. The center position 34 of the voltage divider is connected to noninverting input terminal 36 of the amplifier 29 so that voltage variations at drain 17 of field effect transistor 18 are fed back to amplifier 29 and therefore to the gate of field effect transistor 18 to linearize the source-to-drain current versus source-to-drain voltage characteristic of field effect transistor 18. The inverting input of amplifier 29 therefore is always at a voltage equal to one-half the voltage across field effect transistor 18. This maintains the gate-to-source A.C. voltage of field effect transistor 18 at one-half the drain-to-source A.C. voltage. For a more complete discussion of this linearizing technique see "Circuit Applications of the Field Effect Transistor," published in the March 1962 issue of "Semiconductor Products" on pages 31 and 32.

It should be noted that source 19 of field effect transistor 18 is maintained at a virtual ground by amplifier 22 in combination with feedback resistor 23 so that the voltage divider including resistors 32 and 33 may be returned directly to ground to linearize field effect transistor 18. Alternately, the current flowing through field effect transistor 18 and resistor 26 may be directly subtracted in a differential amplifier having common mode rejection. However, the common mode signal, which would also vary the voltage across field effect transistor 18, would not be compensated by the ground returned voltage-divider feedback. The result is that the common mode signal needs to be made small with respect to the voltage across field effect transistor 18.

The differential adjusting signal on terminal 12 is applied to amplifier 29 through resistor 37. In normal operation the received data signal applied to input terminal 11 is multiplied by a factor proportional to the source-to-drain conductance of the field effect transistor 18 which is controlled by the integral of the differential adjusting signal applied to the terminal 12. The product signal is then available on the output terminal 13.

The initial value of source-to-drain impedance of field effect transistor 18 and therefore the initial value by which the data signal on terminal 11 is multiplied, is set by applying a positive voltage pulse to preset signal input terminal 38. The preset signal is applied by lead 39 to an inhibit 41 of the inhibit gate 14 to block the received data signal so that no voltage appears across resistor 16. The preset signal is also applied by a lead 42 and resistor 43 to differential amplifier 29. Resistor 43 then functionally replaces resistor 16 during the preset sequence. The preset signal is of a standard amplitude so that with resistor 43 in series with the source-to-drain impedance of field effect transistor 18, the voltage appearing at drain 17 of field effect transistor 18 is determined by the source-to-drain impedance of the field effect transistor 18. At this time, the source-to-drain impedance of transistor 18 is effectively in parallel with the fixed value of resistor 26. The former impedance is returned to virtual ground 21, and the latter resistor to virtual ground 27.

The preset pulse further applies current through resistor 44 to saturate normally off transistor 46, which in turn applies voltage from reference voltage source 47 to the inverting input of operational amplifier 29. The low impedance applied to the inverting input of operational amplifier 29 through saturated transistor 46 from voltage source 47 overrides signals applied at terminal 12 through impedance 37. By bringing the summing point of the Miller integrator which includes amplifier 29, capacitor 31, and resistor 37 to a low-imepdance condition, noninverting input 36 of amplifier 29 becomes a summing point for a negative feedback loop which includes amplifier 29 and field effect transistor 18. It should be noted that the inversion necessary for negative feedback is supplied by field effect transistor 18. Resistors 32 and 33 in the voltage divider drive amplifier 29 to vary the gate voltage of field effect transistor 18 until the voltage at drain 17 thereof is essentiallly twice the voltage supplied by reference voltage source 47. By forcing the drain to this voltage, the feedback loop forces the field effect transistor to assume the corresponding resistance value. The low impedance output of amplifier 29 also charges capacitor 31 to hold the voltage applied to the gate of field effect transistor 18 at the appropriate value.

When the preset signal is removed, the gate voltage of field effect transistor 18 is one-half its source-to-drain voltage increased by the voltage across capacitor 31. As differential adjusting signals are received on terminal 12 and integrated by capacitor 31, the source-to-drain impedance of field effect transistor 18 is varied accordingly.

It should be understood that, while the present invention has been described in connection with a particular embodiment thereof, additional embodiments and modifications readily apparent to those skilled in the art are included within the spirit and scope of the invention.

What is claimed is:

1. In combination:

a controlled impedance device responsive to a control signal for varying the impedance between first and second output terminals;

means for inducing a current signal to flow between said first and second output terminals to provide a voltage signal thereacross;

means for comparing said voltage signal with signals applied thereto to provide said control signal;
a reference voltage source;
a preset signal source; and
means for selectively applying said reference voltage to said comparing means in response to said preset signal to bring said impedance between said first and second output terminals to a desired initial value.

2. The combination as defined in claim 1 wherein said comparing means includes means for holding the initial value of said control signal.

3. The combination as defined in claim 1 further including:
means responsive to said preset signal for bringing said current signal to a predetermined value.

4. The combination as defined in claim 3 further including:
means for applying an adjusting current signal to said comparing means.

5. In combination:
a field effect transistor having gate, source and drain terminals;
a differential amplifier having inverting input and noninverting inputs for impressing a signal between said gate and source terminals;
a first resistor connected between said drain terminals and said noninverting input;
a second resistor connected between said noninverting input and a first potential;
means maintaining said source at said first potential;
means for impressing a current through said drain terminals and said source terminals; and
means responsive to a preset signal for bringing said inverting input to a second potential.

6. The combination as defined in claim 5 further including:
a capacitor connected from said gate terminals to said inverting input.

7. In combination:
a field effect transistor having gate, source, and drain terminals;
a differential amplifier having inverting input and noninverting inputs for impressing a signal between said gate and source terminals;
a first resistor connected between said drain terminals and said noninverting input;
a second resistor connected between said noninverting input and a first potential;
means for maintaining said source at said first potential;
means for impressing a current through said drain terminals and said source terminals; and
means responsive to a preset signal for bringing said inverting input to a second potential; said maintaining means includes:
an inverting amplifier having an input terminal and an output terminal;
means for connecting said source terminals to said input terminal; and
a third resistor connected between said input and output terminals.

8. The combination as defined in claim 7 further including:
a summing amplifier providing a signal proportional to the sum of signals applied thereto;
means for connecting the output terminal of said inverting amplifier to said summing amplifier; and
a fourth resistor connected between said drain and said summing amplifier.

9. The combination as defined in claim 8 in which the means connecting the output terminal of said inverting amplifier to said summing amplifier includes a fifth resistor.

References Cited

UNITED STATES PATENTS

| | | | |
|---|---|---|---|
| 3,193,672 | 7/1965 | Azgapetian | 235—194 |
| 3,215,824 | 11/1965 | Alexander et al. | 235—194 X |
| 3,292,013 | 12/1966 | Golahny | 307—304 X |
| 3,289,102 | 11/1966 | Hayashi | 307—304 X |

MALCOLM A. MORRISON, Primary Examiner

U.S. Cl. X.R.

307—229